United States Patent
Okazaki et al.

[11] Patent Number: 5,281,349
[45] Date of Patent: Jan. 25, 1994

[54] HEAT-TRANSFER MEDIUM COMPOSITIONS

[75] Inventors: Hiroshi Okazaki, Munakata; Masaharu Inoue; Hisayuki Ishida, both of Kitakyushu, all of Japan

[73] Assignee: Nippon Steel Chemical Co., Ltd., Tokyo, Japan

[21] Appl. No.: 902,742

[22] Filed: Jun. 23, 1992

[30] Foreign Application Priority Data

Jun. 28, 1991 [JP] Japan ................................. 3-183918

[51] Int. Cl.$^5$ ............................................. C09K 5/00
[52] U.S. Cl. ..................................... 252/73; 252/570; 252/578
[58] Field of Search ....................... 252/73, 32.7 E, 75

[56] References Cited

U.S. PATENT DOCUMENTS

| | | | |
|---|---|---|---|
| 1,874,258 | 7/1929 | Dow | 252/73 |
| 1,882,809 | 2/1929 | Grebe | 252/73 |
| 1,972,847 | 12/1931 | Levine et al. | 252/73 |
| 2,000,886 | 11/1931 | Dow | 252/73 |

Primary Examiner—Paul Lieberman
Assistant Examiner—Necholus Ogden
Attorney, Agent, or Firm—Armstrong, Westerman, Hattori, McLeland & Naughton

[57] ABSTRACT

The heat-transfer medium compositions of this invention contain biphenyl, diphenyl ether and diphenylene oxide with diphenylene oxide added in a proportion of 1 to 30% by weight and they are useful for high-temperature equipment such as chemical reactors and solar heat power plants for their long-term serviceability in the vicinity of 400° C. and their fluidity at ambient temperature.

2 Claims, 2 Drawing Sheets

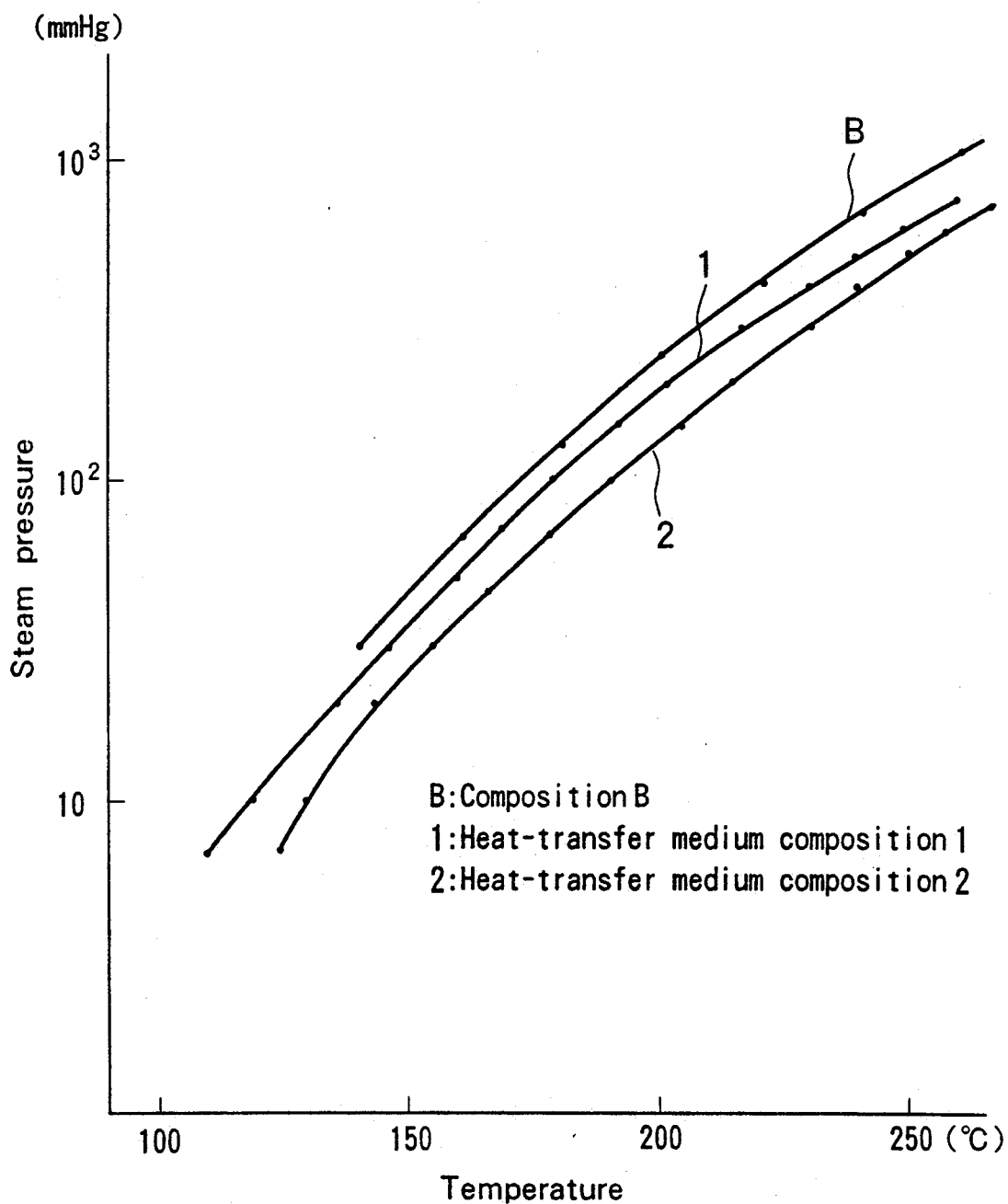

HEAT-TRANSFER MEDIUM COMPOSITIONS

FIELD OF THE INVENTION AND RELATED ART STATEMENT

This invention relates to heat-transfer medium compositions.

Heat-transfer media are used mostly at high temperature and are expected to be high-boiling and heat-resistant and, additionally, to remain liquid during shutdown of the equipment. Heat-transfer media based on aromatic hydrocarbons of excellent heat stability are known to possess the aforesaid characteristics. In particular, a large number of reports have been made on biphenyl-based heat-transfer media for their excellent performance. U.S. Pat. No. 1,882,809 describes a heat-transfer medium composed of biphenyl and diphenyl ether and this is commended for use as one of the most thermally stable organic heat-transfer media available at the present time. This particular heat-transfer medium is designed on the basis of the fact that its melting point has a minimum near a composition of 26.5% by weight of biphenyl and 73.5% by weight of diphenyl ether. The melting point in this case is approximately 13° C., which still appears somewhat high.

The melting point may be lowered by the use of low-melting substances. Such substances, however, are generally low-boiling or thermally unstable. In consequence, practically no organic heat-transfer media other than those mentioned above have been available until today for continuous service at temperatures as high as 400° C.

OBJECT AND SUMMARY OF THE INVENTION

The present inventors have conducted extensive studies to solve the aforesaid problems, found that an addition of diphenylene oxide to heat-transfer media based on biphenyl and diphenyl ether can lower their melting point without sacrificing their heat stability, and completed this invention.

Accordingly, it is an object of this invention to provide novel heat-transfer medium compositions with good heat resistance, high boiling point and low pour point.

This invention thus relates to heat-transfer medium compositions comprising biphenyl, diphenyl ether and diphenylene oxide with diphenylene oxide added in a proportion of 1 to 30% by weight.

Diphenylene oxide, of which another name is dibenzofuran, is a tricyclic aromatic compound with a melting point of 83° C. and a boiling point of 287° C. and occurs in relatively large quantities in coal tar. According to a study by the present inventors, the C—C, C—H and C—O linkages in diphenylene oxide are inferred to be as stable as those in biphenyl and diphenyl ether. Being high-melting and solid at ambient temperature, however, diphenylene oxide appeared unsuitable for heat-transfer use. Then came the finding that, when the compound was added to a mixture of biphenyl and diphenyl ether, the resulting composition had a substantially lower melting point and became liquid at ambient temperature.

The heat-transfer medium compositions of this invention based on biphenyl, diphenyl ether and diphenylene oxide comprise diphenylene oxide in a proportion of 1 to 30% by weight, preferably 2 to 22% by weight, more preferably 4 to 20% by weight and the sum of biphenyl and diphenyl ether in a proportion of 99 to 70% by weight, preferably 98 to 78% by weight, more preferably 96 to 80% by weight. With more than 30% by weight of diphenylene oxide, the composition solidifies above ambient temperature. With less than 1% by weight of diphenylene oxide, the effect of lowering the melting point becomes too small to be viable.

The ratio of biphenyl and diphenyl ether can be varied at will, but it ranges from 10 to 40 parts by weight of the former to 90 to 60 parts by weight of the latter, preferably from 15 to 30 parts by weight of the former to 85 to 70 parts by weight of the latter, more preferably from 20 to 28 parts by weight of the former to 80 to 72 parts by weight of the latter. It is advantageous to choose a ratio so that the melting point or the solidification of the final heat-transfer composition becomes 12.0° C. or less. Such a ratio can readily be chosen from the aforesaid range. The heat-transfer medium compositions of this invention need not be restricted to the above-mentioned three components and may additionally contain compounds of a suitable boiling point and heat stability, for example, phenanthrene and methylnaphthalene, in small quantities.

The heat-transfer medium compositions of this invention are fluid at ambient temperature, undergo virtually no decomposition at approximately 360° C. and can be used continuously over an extended period of time even at temperatures as high as 400° C. The compositions of this invention thus show the highest working temperature among organic heat-transfer media and they are useful for chemical reactors operated at high temperature and for solar heat power plants. Since the heat-transfer medium compositions of this invention boil in the vicinity of 250° C., they are used under pressure when the working temperature exceeds their boiling point.

The heat-transfer medium compositions of this invention show the highest level of heat resistance among organic heat-transfer media and are extremely useful for high-temperature equipment. In addition, they are easy to handle as their melting point or solidification point is equal to or below ambient temperature.

BRIEF DESCRIPTION OF THE DRAWING

FIG. 2 is a graph showing the relationship between temperature and vapor pressure on the heat-transfer medium compositions.

DETAILED DESCRIPTION OF THE PREFERRED EMBODIMENTS

Figure 1:
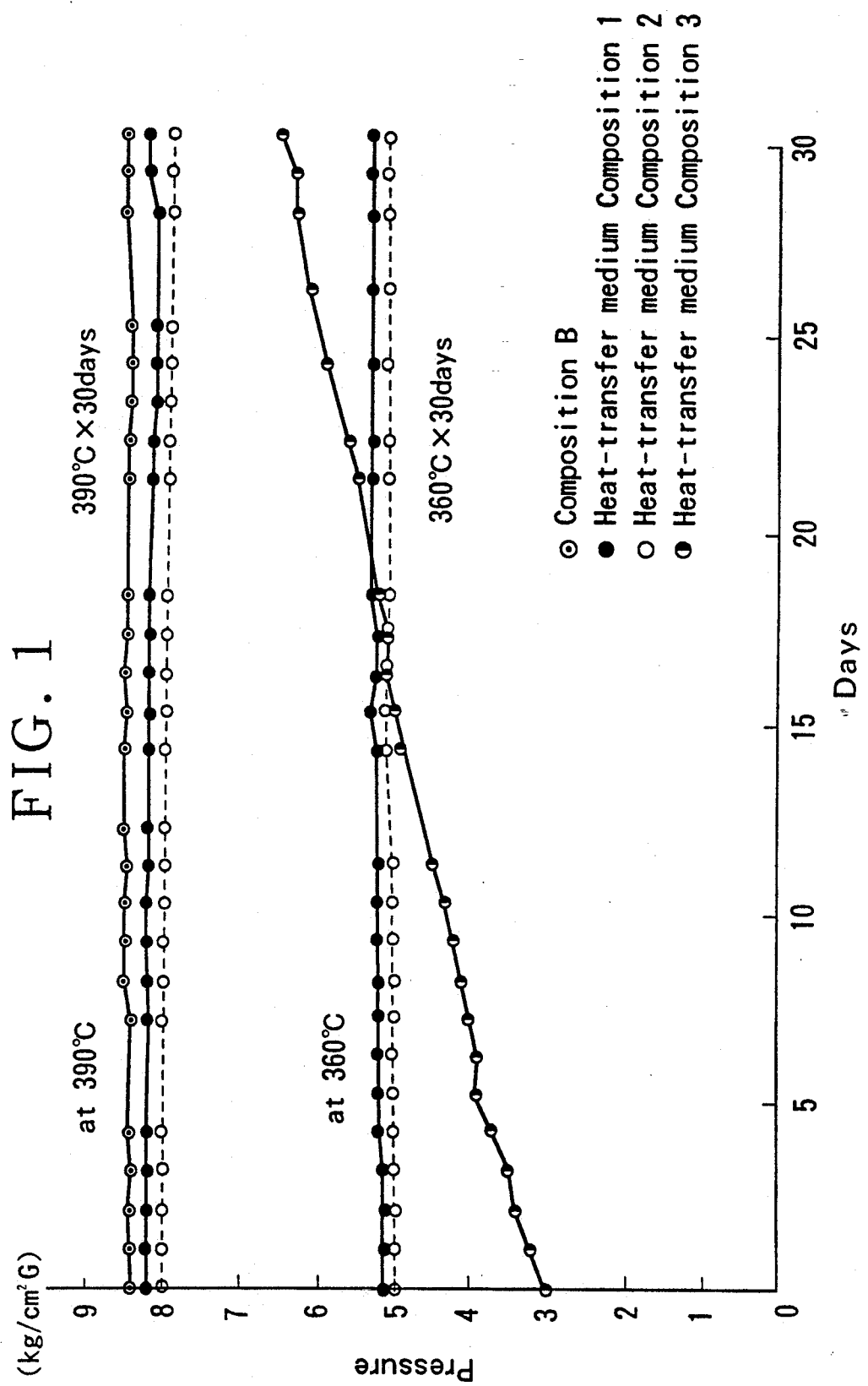
FIG. 1 is a graph showing the results of the heat stability tests run on the heat-transfer medium compositions.

This invention will be described in detail with reference to the accompanying examples and comparative examples.

EXAMPLE 1

Composition A containing 20.0% by weight of biphenyl and 80.0% by weight of diphenyl ether, Composition B containing 26.5% by weight of biphenyl and 73.5% by weight of diphenyl ether, Composition C containing 30.0% by weight of biphenyl and 70.0% by weight of diphenyl ether and Composition D containing 40.0% by weight of biphenyl and 60.0% by weight of diphenyl ether were prepared, diphenylene oxide was added to each composition in the proportion shown in Table 1, and the solidification point of each of the resulting heat-transfer medium compositions is shown in Table 1.

EXAMPLE 2

Heat-transfer medium composition 1 containing 85% by weight of Composition B and 15% by weight of diphenylene oxide, heat-transfer medium composition 2 containing 78% by weight of Composition C and 22% by weight of diphenylene oxide, heat-transfer medium composition 3 containing 78% by weight of ethylbiphenyl and 22% by weight of diphenylene oxide (solidification point −0.8° C.) and Composition B were submitted to a heat stability test by heating the specimens at 360° C. or 390° C. for 30 days in an atmosphere of nitrogen in an autoclave. The heat-transfer medium compositions other than 1 and 2 were tested for comparison. The passage of time and change in pressure are shown in FIG. 1 and the amount and composition of gases evolved and changes of physical properties in the heat stability test at 360° C. are shown in Table 2 and those in the test at 390° C. in Table 3. Gas-chromatographic analyses before and after the heat stability test detected no new peaks near the main components of heat-transfer medium compositions 1 and 2. Moreover, the vapor pressures of the heat-transfer medium compositions 1 and 2 and Composition B were measured. The results are shown in FIG. 2.

TABLE 1

| Composition Kind | Proportion (wt. %) | Proportion of diphenylene oxide (wt. %) | Solidification point of heat-transfer medium composition (°C.) |
|---|---|---|---|
| A | 100 | 0 | 12.4 |
| A | 90 | 10 | 8.6 |
| A | 85 | 15 | 8.2 |
| A | 80 | 20 | 8.4 |
| B | 100 | 0 | 12.3 |
| B | 95 | 5 | 10.4 |
| B | 90 | 10 | 8.5 |
| B | 85 | 15 | 7.3 |
| B | 80 | 20 | 9.4 |
| B | 79 | 21 | 9.4 |
| B | 78 | 22 | 12.6 |
| B | 77 | 23 | 14.2 |
| C | 100 | 0 | 14.4 |
| C | 90 | 10 | 14.0 |
| C | 85 | 15 | 11.1 |
| C | 80 | 20 | 9.9 |
| C | 78 | 22 | 11.4 |
| C | 77 | 23 | 14.2 |
| D | 100 | 0 | 26.6 |
| D | 95 | 5 | 25.6 |
| D | 90 | 10 | 24.2 |
| D | 85 | 15 | 22.8 |
| D | 80 | 20 | 21.4 |
| D | 75 | 25 | 20.5 |
| D | 70 | 30 | 25.5 |

TABLE 2

Heat stability test at 360° C.

| | Heat-transfer medium composition | | |
|---|---|---|---|
| | 1 | 2 | 3 |
| Proportion of components (wt %) | | | |
| biphenyl | 22.5 | 23.4 | — |
| dipheny ether | 62.5 | 54.6 | — |
| diphenylene oxide | 15 | 22 | 22 |
| ethylbiphenyl | — | — | 78 |
| Gases evolved (ml.) | 69 | 73 | 859 |
| Composition (vol. %) | | | |
| $H_2$ | 67.8 | 60.3 | 47.8 |
| $CH_4$ | 18.2 | 26.0 | 25.2 |
| CO | 5.8 | 5.7 | 2.4 |
| $CO_2$ | 7.4 | 6.6 | 5.5 |
| $C_2H_4$ | ND*[1] | ND | ND |
| $C_2H_6$ | ND | ND | 18.0 |
| $C_3H_8$ | ND | 0.7 | 0.9 |
| $C_4H_{10}$ | 0.8 | 0.7 | 0.2 |
| Changes in properties (before test/after test) | | | |
| Specific gravity*[2] | 1.074/1.073 | 1.077/1.078 | 1.035/1.033 |
| Viscosity (cp/25° C.) | 3.7/3.8 | 3.8/3.8 | 5.5/5.5 |
| precipitation | trace/trace | trace/trace | trace/trace |
| residual carbon (wt %) | <0.01/<0.01 | <0.01/<0.01 | <0.01/<0.02 |
| Total amount of distillate in distillation test (vol %) | 98.0/98.0 | 98.0/98.0 | 98.0/98.0 |

*[1]Not detected,
*[2]25/4° C.

TABLE 3

Heat stability test at 390° C.

| | Heat-transfer medium composition | | Composition B |
|---|---|---|---|
| | 1 | 2 | |
| Gases evolved (ml.) | 60 | 60 | 53 |
| Composition (vol. %) | | | |
| $H_2$ | 83.2 | 83.2 | 76.0 |
| $CH_4$ | 4.7 | 5.6 | 9.5 |
| CO | 5.6 | 5.6 | 7.3 |
| $CO_2$ | 3.7 | 2.8 | 3.1 |
| $C_2H_4$ | ND*[1] | ND | ND |
| $C_2H_6$ | 1.9 | 1.9 | 3.1 |
| $C_3H_8$ | 0.9 | 0.9 | 1.0 |
| $C_4H_{10}$ | ND | ND | ND |
| Changes in properties (before test/after test) | | | |
| Specific gravity*[1] | 1.074/1.072 | 1.077/1.077 | 1.061/1.060 |
| Viscosity (cp/25° C.) | 3.7/3.8 | 3.8/3.7 | 3.7/3.6 |
| precipitation | trace/trace | trace/trace | trace/trace |
| residual carbon (wt %) | <0.01/<0.01 | <0.01/<0.04 | <0.01/<0.01 |
| Total amount of distillate in distillation test (vol %) | 98.0/98.0 | 98.0/98.0 | 98.0/98.0 |

*[1]Not detected,
*[2]25/4° C.

What is claimed is:

1. A heat-transfer medium composition which comprises 80 to 96% by weight of the sum of biphenyl and diphenyl ether and 4 to 20% by weight of diphenylene oxide wherein the ratio of biphenyl to diphenyl ether is from 20 to 28% by weight to 80 to 72% by weight.

2. A heat-transfer medium composition according to claim 1 wherein the melting point is 10.4° C. or less.

* * * * *